(12) United States Patent
Dong et al.

(10) Patent No.: US 8,405,967 B2
(45) Date of Patent: Mar. 26, 2013

(54) ELECTRONIC DEVICE WITH SLOT COVER EJECTION MECHANISM

(75) Inventors: Hong-Wei Dong, Shenzhen (CN);
 Zhi-Gang Yang, Shenzhen (CN);
 Jian-Feng Fan, Shenzhen (CN);
 Jin-Hong Qin, Shenzhen (CN);
 Chia-Min Wang, New Taipei (TW);
 Kun-Chih Hsieh, New Taipei (TW)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 18 days.

(21) Appl. No.: 13/271,252

(22) Filed: Oct. 12, 2011

(65) Prior Publication Data

US 2013/0050913 A1 Feb. 28, 2013

(51) Int. Cl.
 *H05K 5/00* (2006.01)
 *H05K 7/00* (2006.01)

(52) U.S. Cl. ............... 361/679.31; 361/679.32

(58) Field of Classification Search ............. 361/679.31, 361/679.32
See application file for complete search history.

(56) References Cited

U.S. PATENT DOCUMENTS

| | | | | |
|---|---|---|---|---|
| 5,299,089 A * | 3/1994 | Lwee | ...................... | 361/679.33 |
| 5,324,204 A * | 6/1994 | Lwee | .............................. | 439/64 |
| 5,401,176 A * | 3/1995 | Lwee | .............................. | 439/64 |
| 6,287,143 B1 * | 9/2001 | Lwee | ........................ | 439/541.5 |

* cited by examiner

Primary Examiner — Anthony Haughton
(74) Attorney, Agent, or Firm — Altis Law Group, Inc.

(57) ABSTRACT

An electronic device includes a frame defining a slot and a through hole, a slot cover moveably received in the slot, an elastic piece rotatably connected to the frame, and a torsion spring. The elastic piece includes a main body, a side arm and an extended tab defined on opposite ends of the main body. When the elastic piece is at a normal position, the side arm faces the first through hole, and the tab faces the slot. The torsion spring includes a first arm fixed to the frame and a second arm fixed to the elastic piece. The elastic piece is rotatable by insertion of an elongated object into through the through hole to push the side arm, thereby causing the tab to push the slot cover to be deformed until the hook disengages from the slot.

7 Claims, 5 Drawing Sheets

ELECTRONIC DEVICE WITH SLOT COVER EJECTION MECHANISM

BACKGROUND

1. Technical Field

The present disclosure relates to electronic devices, and particularly, to an electronic device with a slot cover ejection mechanism.

2. Description of the Related Art

Electronic devices such as cell phones usually operate with an electronic card, such as subscriber identity module (SIM) card. Commonly, the SIM card is positioned in the electronic device. A user has to open a back cover of the electronic device when attempting to take out the SIM card, which is inconvenient.

Therefore, there is room for improvement within the art.

BRIEF DESCRIPTION OF THE DRAWINGS

The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
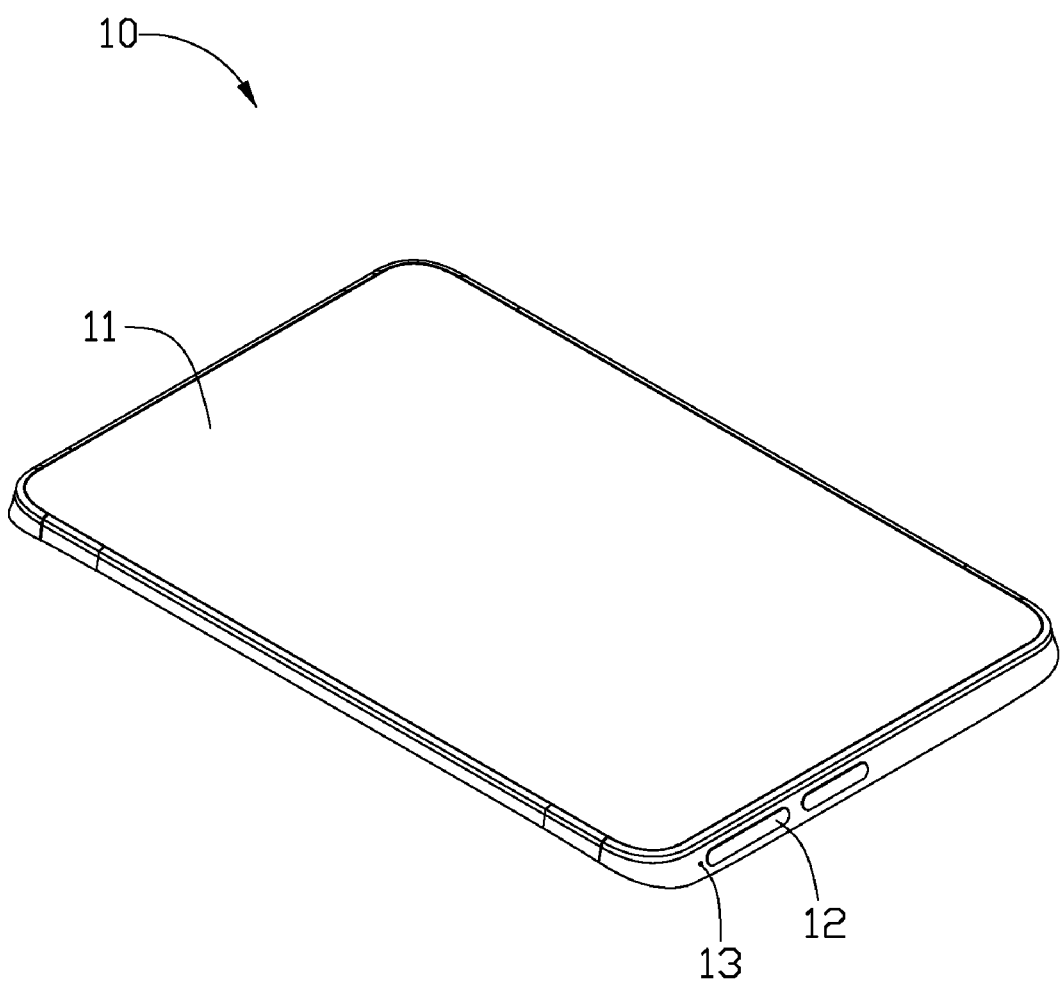
FIG. 1 is an assembled view of an electronic device in accordance with an exemplary embodiment.
Figure 2:
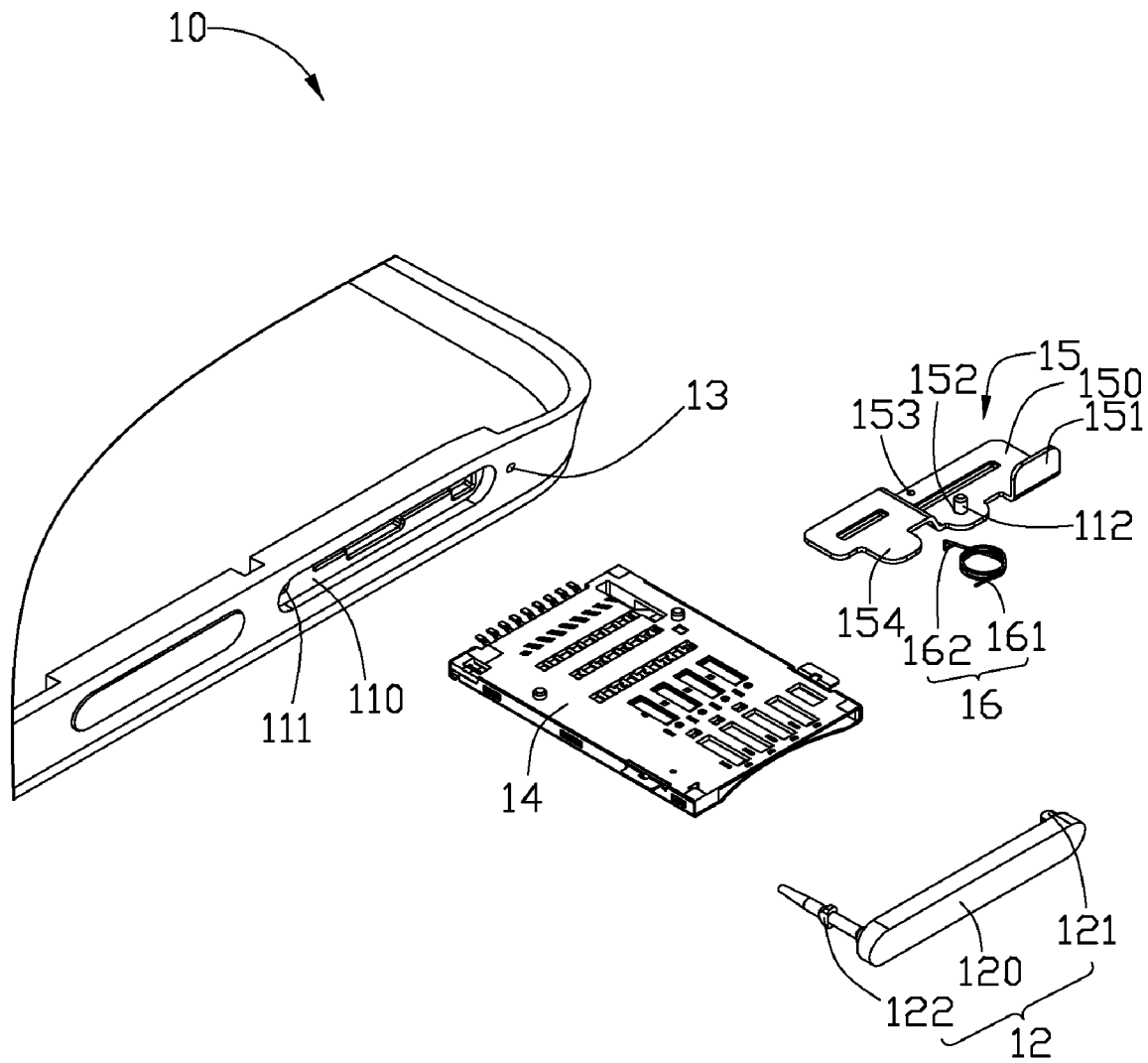
FIG. 2 is an isometric exploded view of the electronic device in FIG. 1.

Referring to FIGS. 1 and 2, an electronic device 10 includes a frame 11 and a slot cover 12. The frame 11 is mounted between an upper housing (not shown) and a lower housing (not shown) of the electronic device 10, and used to support elements (not shown) of the electronic device 10. A through hole 13 and a slot 110 are defined in a side of the frame 11. The slot 110 can receive the cover 12. An electronic card connector (not shown) is arranged within the frame 11 and electrically connected to a circuit board (not shown) with an open end aligned with the slot 110, and is used to receive an electronic card, such as a flash memory card or a subscriber identity module (SIM) card. The cover 12 is configured to cover the slot 110. The connector includes a conventional ejection mechanism (not shown) configured to push an electronic card out when the electronic card is depressed.

The cover 12 includes a main body 120, an elastic hook 121 and a positioning post 122 both protruding from the inside of the cover 12. The hook 120 and the positioning post 121 are located at two opposite ends of the main body 120. The hook 121 engages with the inner edge of the frame 11 in the slot 110 when the cover 12 is retained in the slot 110, thereby limiting the movement of the cover 12. The positioning post 121 is moveably received in a through hole 111 defined in the frame 11.

The electronic device 10 further includes an elastic piece 15, and a torsion spring 16. The elastic piece 15 includes a main body 150 and a side arm 151 perpendicularly protrude from the main body 150. When the elastic piece 15 is retained in a normal position, the side arm 151 faces the through hole 13. A first through hole 152 and a second through hole 153 are defined in the elastic piece 15. A protruding pin 112 of the frame 11 is received in the first through hole 152. The torsion spring 16 is coiled around the protruding pin 112.

Figure 3:
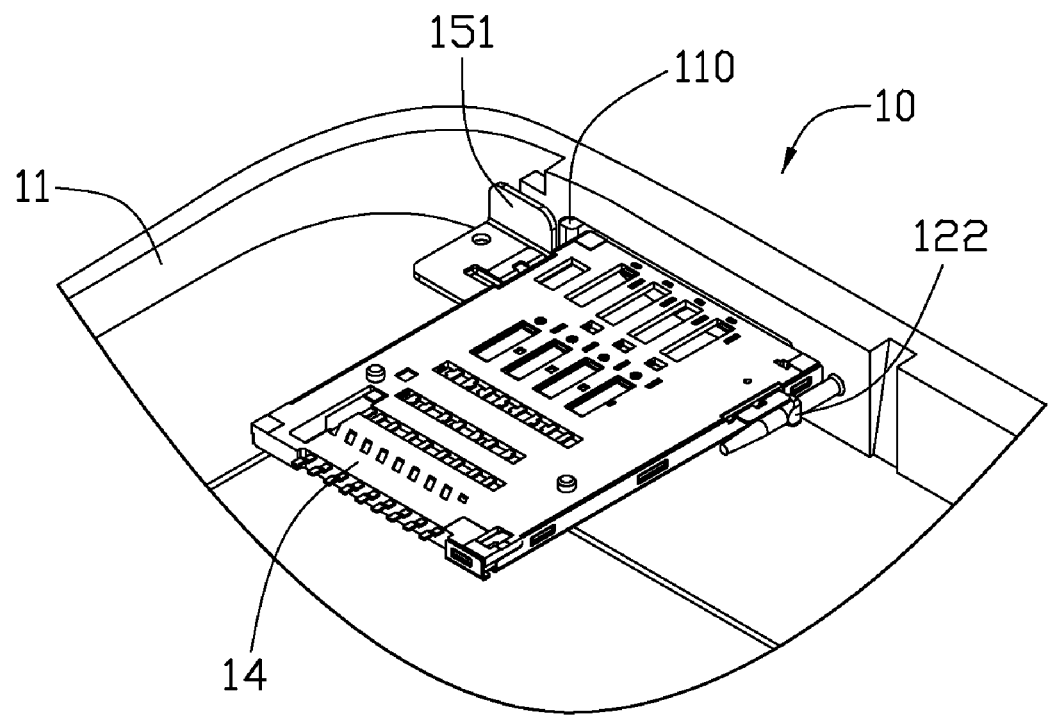
FIG. 3 is a cross-sectional view of the electronic device in FIG. 1.
Figure 4:
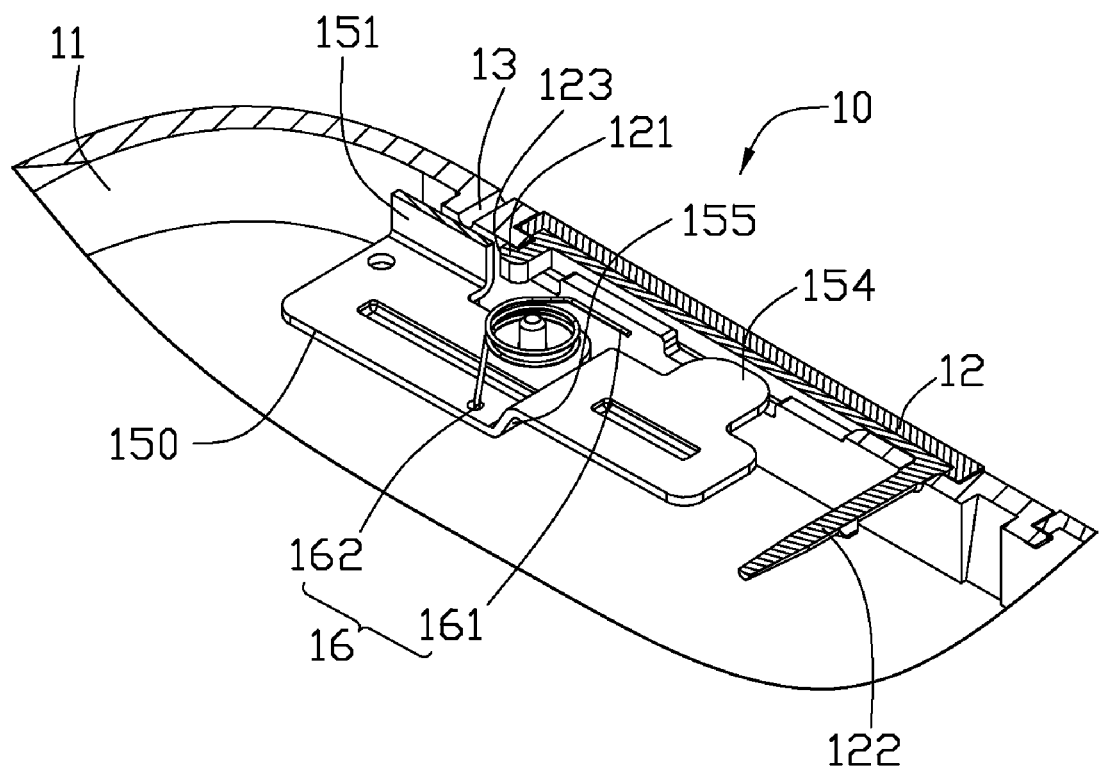
FIG. 4 is similar to FIG. 3, but viewed from a rear aspect.

Referring to FIGS. 3 and 4, the torsion spring 16 includes a first arm 161 and a second arm 162. The first arm 161 is fixed to the inner side of the frame 11, and the end of the second arm 162 is received in the second through hole 153. The torsion spring 17 can retain the elastic piece 15 in the normal position. The elastic piece 15 further includes an extended tab 154 that is substantially parallel to the main body 150. The elastic piece 15 further includes a connecting portion 155 extending from the main body 150 and connected to the tab 154. The tab 154 faces the slot 110 when the elastic piece 15 is retained in the normal position.

Figure 5:
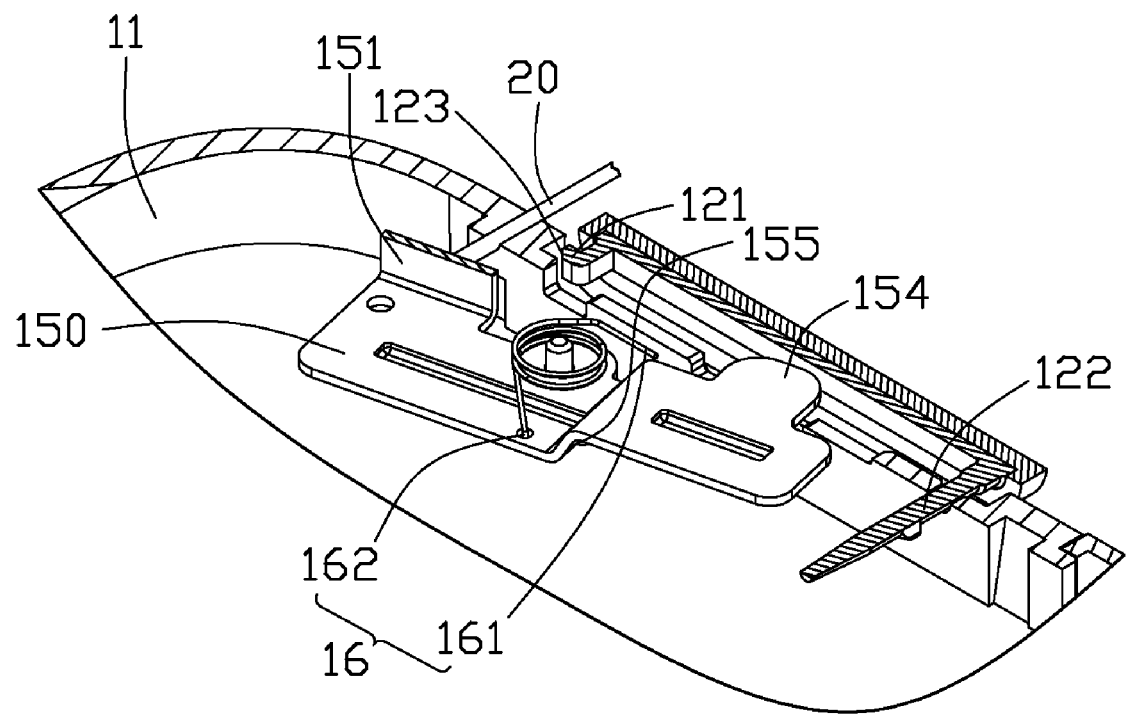
FIG. 5 is a cross-sectional view of the electronic device in FIG. 1 when a cover is pushed into the opening.

Referring to FIG. 5, when needed, a thin pin 20 can be inserted into the through hole 13 to push the side arm 151. The elastic piece 15 is then urged to rotate, causing the tab 154 to move to push the main body 120. Then the main body 120 is elastically deformed until the elastic hook 120 disengages from the inner edge of the slot 110, which frees the main body 120 of the cover 12 from the limitation of the slot 110. The cover 12 can then move out of the slot 110.

In the embodiment, the positioning post 122 is made of elastic material. When moving out of the slot 110, the cover 12 can be turned over to show the electronic card positioned in the connector. In an alternative embodiment, the positioning post 122 may be made of rigid material. When freeing from the limitation of the tab 154, the cover 12 can be pulled out of the opening 111 to disengage from the frame 11, allowing the electronic card in the connector to be exposed.

When the thin pin 20 pushes the side arm 151, the second arm 162 fixed to the elastic piece 15 is driven to move in union with the elastic piece 15. The spring 16 is thus deformed. When the hook 120 disengages from the inner edge of the slot 110, the elastic piece 15 is urged to return to the normal position by the restoring force of the spring 16.

When the electronic card has been removed or inserted into the connector again, a user can push the main body 120 into the slot 110. In the embodiment, the hook 120 includes an inclined plane 123 at the free end of the hook 120. The inclined plane 123 first resists against the edge of the slot 110 when the cover 12 is pushed into the slot 110, causing the hook 120 to be deflected. After the end of the hook 120 moves over the inner side of the slot 110, the hook 120 rebounds to engage the inner edge of the slot 110. Thus, the cover 12 can be retained in the slot 110.

It is understood that the present disclosure may be embodied in other forms without departing from the spirit thereof. Thus, the present examples and embodiments are to be considered in all respects as illustrative and not restrictive, and the disclosure is not to be limited to the details given herein.

What is claimed is:

1. An electronic device comprising:
   a frame defining a slot and a through hole;
   a slot cover moveably received in the slot, the slot cover comprising an elastic hook, the hook configured for engaging with an inner edge of the frame in the slot when the cover is retained in the slot;
   an elastic piece rotatably connected to the frame, the elastic piece comprising a main body, a side arm protruding from one edge of the main body, and an extended tab protruding from one end of the main body, wherein when the elastic piece is at a normal position, the side arm faces the through hole, and the tab faces the slot; and
   a torsion spring comprising a first arm and a second arm, the first arm fixed to the frame, and the second arm fixed to the elastic piece;

wherein the elastic piece is rotatable by insertion of an elongated object into the through hole to push the side arm, thereby causing the tab to push the slot cover to be deformed until the hook disengages from the slot.

2. The electronic device as recited in claim 1, wherein the cover further comprises a positioning post, the hook and the positioning post are located at opposite ends of the cover, and the positioning post is moveably received in the frame.

3. The electronic device as recited in claim 2, wherein the positioning post is made of elastic material.

4. The electronic device as recited in claim 2, wherein the positioning post is made of rigid material.

5. The electronic device as recited in claim 1, wherein a first through hole and a second through hole are defined in the elastic piece, the frame further includes a protruding pin received in the first through hole, and the torsion spring is coiled around the protruding pin.

6. The electronic device as recited in claim 1, wherein the side arm perpendicularly protrudes from the main body, and the tab is substantially parallel to the main body.

7. The electronic device as recited in claim 1, wherein the elastic piece further comprises a connecting portion extending from the main body to the tab.

* * * * *